United States Patent
Williams et al.

(10) Patent No.: US 7,284,491 B2
(45) Date of Patent: Oct. 23, 2007

(54) GRATE STRUCTURE FOR SOLID FUEL BURNERS

(75) Inventors: Paul Douglas Williams, Hampstead, NC (US); Gerald David Williams, North Carlton (AU)

(73) Assignee: Salinas Energy Limited, Perth (AU)

( * ) Notice: Subject to any disclaimer, the term of this patent is extended or adjusted under 35 U.S.C. 154(b) by 0 days.

(21) Appl. No.: 10/451,463

(22) PCT Filed: Dec. 21, 2001

(86) PCT No.: PCT/AU01/01666

§ 371 (c)(1),
(2), (4) Date: Mar. 30, 2004

(87) PCT Pub. No.: WO02/052197

PCT Pub. Date: Jul. 4, 2002

(65) Prior Publication Data

US 2004/0159269 A1 Aug. 19, 2004

(30) Foreign Application Priority Data

Dec. 22, 2000 (AU) .................... PR 2291

(51) Int. Cl.
*F23H 7/08* (2006.01)
(52) U.S. Cl. .............. 110/281; 110/291; 110/328; 110/229; 110/255; 48/87
(58) Field of Classification Search ........... 110/278, 110/281, 291, 327, 328, 229, 230, 231, 255, 110/257, 258; 48/197 R, 87, 111, 77, 209, 48/63, 113
See application file for complete search history.

(56) References Cited

U.S. PATENT DOCUMENTS 3,812,794 A * 5/1974 Taylor .................. 110/186

(Continued)

FOREIGN PATENT DOCUMENTS

| WO | WO96/13692 | 5/1996 |
| WO | WO97/01617 | 1/1997 |

OTHER PUBLICATIONS

International Search Report—PCT/AU01/01666; ISA/Australian Patent Office, Jan. 29, 2002.

*Primary Examiner*—Kenneth Rinehart
(74) *Attorney, Agent, or Firm*—Harness, Dickey & Pierce, PLC (57) ABSTRACT

In one aspect, a grate segment for a burner, comprises a substantially rigid body (30) having a dispersed array of cavities (38) filled with a refractory material. In another aspect, a solid fuel gasifier includes a housing (12) defining a gasifier chamber (14), and a solid fuel inlet (21), grate structure (22, 24) in the gasifier chamber. The grate structure includes base means, a plurality of agitator segments (32) positioned relative to the base means for reciprocating movement to agitate a fuel load in the gasifier, and means to support the base means and the agitator segments so that the latter reciprocate in a direction at a substantial inclination to both horizontal and vertical. In use of the gasifier a deep burden of fuel accumulates on the grate structure and the outward stroke of the reciprocation of the agitator elements is in the overall direction of flow of the fuel burden or generally oppositely thereto.

17 Claims, 8 Drawing Sheets

U.S. PATENT DOCUMENTS

| | | | |
|---|---|---|---|
| 3,863,578 A | * | 2/1975 | Kato et al. .................. 110/257 |
| 3,937,155 A | * | 2/1976 | Kunstler .................... 110/255 |
| 3,985,084 A | * | 10/1976 | Delaplace .................. 110/281 |
| 4,098,586 A | | 7/1978 | Woodmansee |
| 4,385,567 A | * | 5/1983 | Voss ........................... 110/186 |
| 4,495,872 A | * | 1/1985 | Shigaki ....................... 110/190 |
| 5,307,746 A | * | 5/1994 | Khinkis et al. ............. 110/245 |
| 5,882,189 A | | 3/1999 | Fehsenmayr et al. |
| 5,961,673 A | | 10/1999 | Topf et al. |

* cited by examiner

GRATE STRUCTURE FOR SOLID FUEL BURNERS

CROSS-REFERENCE TO RELATED APPLICATIONS

This application is a U.S. National Stage of International Application No. PCT/AU01/01666 filed 21 Dec. 2001. This application claims the benefit of Australian Application No. PR 2291, filed 22 Dec. 2000. The disclosure(s) of the above applications are incorporated herein by reference.

FIELD OF THE INVENTION

This invention relates generally to solid fuel burners and has particular, though not exclusive, application to a solid fuel burner of the type commonly referred to as a gasifier or gasifier combustor.

BACKGROUND ART

A gasifier generally includes a primary combustion chamber into which solid fuel is loaded on to a grate structure on which it is first dried and gasified via controlled primary combustion. The resultant gas is then transferred into a secondary combustion chamber, which may conveniently be a cycloburner, for secondary combustion to produce a high temperature relatively clean flue gas able to be used for a variety of purposes, eg. power generation or heating. There is a small residue of inorganic matter.

A gasifier of the general type to which the present invention relates is disclosed, for example in U.S. Pat. No. 4,716,842, and the technology generally is of particular interest in waste recycling, especially with an emphasis on so called "green power" generation. Specific solid fuels which may conveniently be gasified in this way include biological waste, agricultural byproducts, wood waste and biomass.

Problems experienced with gasifiers, as with many other high temperature furnace processes, include sintering or aggregation of solid fines, and the difficulty of achieving thorough mixing of fuel and air/gas streams. It is thought by the inventor that these problems can be minimised over time in the initial gasification process by appropriate design of the grate structure and it is towards this preferred objective that the present invention is especially directed.

U.S. Pat. No. 5,680,824 discloses a grate structure in which moveable hollow grate plates with coolant passages are reciprocable between staitonary grate plates.

The invention seeks to provide an improved grate construction for furnaces generally, but especially for solid fuel gasifiers.

SUMMARY OF THE INVENTION

The invention accordingly provides, in a first aspect, a grate segment for a burner, comprising a substantially rigid body having a dispersed array of cavities filled with a refractory material.

Preferably, the grate segment is one of two or more (more preferably multiple) complementary, generally planar grate segments for forming a grate assembly, in which said cavities are open in a heat-exposed surface of the assembly.

The refractory material is preferably a ceramic material.

Advantageously, the dispersed array of cavities is such that the grate segment exhibits a generally honeycomb structure.

In one application, the solid fuel burner is a gasifier.

In a second aspect, the invention is directed to a solid fuel gasifier, including:

a housing defining a gasifier chamber;

grate structure in said gasifier chamber, including:

base means;

a plurality of agitator segments positioned relative to the base means for reciprocating movement to agitate a fuel load in the gasifier; and means to support the base means and the agitator segments so that the latter reciprocate in a direction at a substantial inclination to both horizontal and vertical; and a solid fuel inlet;

whereby in use of the gasifier a deep burden of fuel accumulates on the grate structure and the outward stroke of said reciprocation is in the overall direction of flow of the fuel burden or generally oppositely thereto.

The second aspect of the invention stems from an appreciation by the present inventor that an optimum outcome is achieved by adopting a mobile grate structure which is a compromise between mere horizontal conveyance and the maximum agitation achieved by vertical disturbance of the fuel load, eg. in a fluidised bed burner. By the arrangement of the invention, there is achieved a high degree of agitation of the fuel load simultaneously with a controlled but relatively slow conveyance of the load.

Preferably, a grate structure according to the second aspect of the invention comprises respective substantially fixed grate sections forming the base means, and moveable grate sections forming the agitator elements. These moveable sections reciprocally slide over the fixed sections. There may be multiple pairs of said fixed grate sections and said moveable grate sections.

Preferably, means is provided to admit air to the fuel load via passages and/or port means in the fixed grate sections. The air admission means preferably opens into the fuel burden in the end surfaces of the fixed grate sections.

Preferably, the gasifier has a solid fuel inlet positioned generally behind the grate structure(s) relative to a general direction of projection of the grate structure and overall direction of flow of the fuel, whereby in use of the gasifier a deep burden of fuel accumulates on the grate structure and the outward stroke of said reciprocation is in the overall direction of flow of the fuel burden. Preferably this sustained reciprocating movement is effective to agitate the fuel and enhance its combustion, and to steadily and slowly stroke or convey it along the chamber.

Preferably, the grate structure is arranged as a plurality of banks of agitator elements, including a first bank with respect to the fuel delivery means that serves as a preheater and drying grate, and a second and optional subsequent banks that provide for gasification of the fuel volatile matter and fixed carbon oxidation.

Preferably, the preheater grate is arranged so that the agitator segments reciprocate in a direction more steeply inclined to the horizontal than that for the gasification grate(s) and the optional subsequent banks are less steeply inclined than the second grate for gasification.

In a preferred embodiment of the second aspect of the invention, each grate section is formed from grate segments in accordance with the first aspect of the invention.

BRIEF DESCRIPTION OF THE DRAWINGS

The invention will now be further described, by way of example only, with reference to the accompanying drawings, in which.

DESCRIPTION OF PREFERRED EMBODIMENTS

Figure 1:
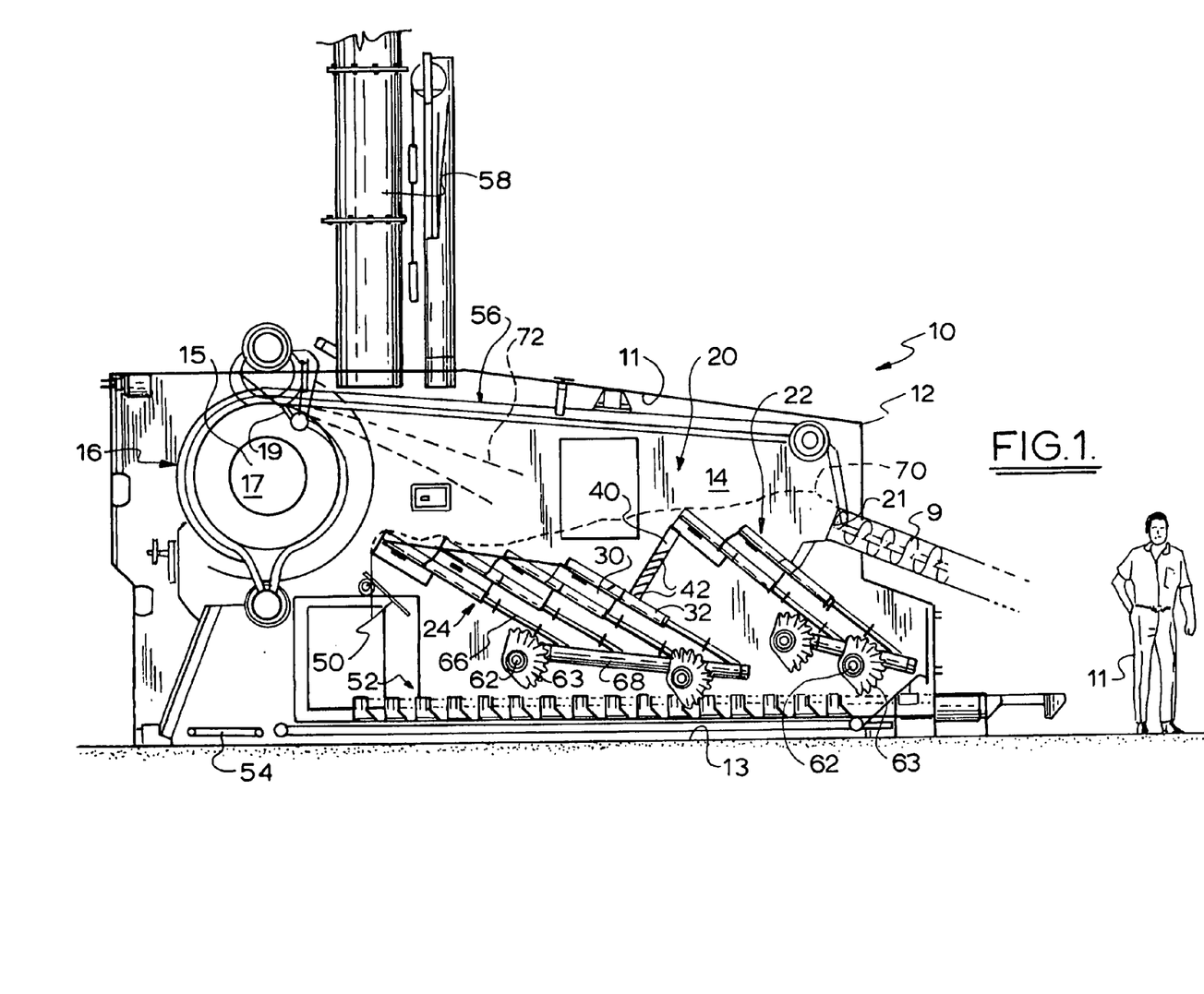
FIG. 1 is a diagrammatic vertical longitudinal section of a solid state gasifier incorporating an embodiment of both aspects of the invention.

The solid fuel gasifier 10 of FIG. 1 (which includes a figure of a man 11 to provide a dimensional context), includes an outer housing 12 about a gasification chamber 14 extending from a fuel delivery auger 9 towards a separately walled cycloburner 16 that defines a secondary combustion chamber 17. A grate structure 20 includes a preheating grate 22 adjacent the delivery end of auger 9, and, downstream in the overall direction of flow of the solid fuel, a gasifier grate 24. The two grates 22, 24 each include stepped pairs of fixed 30 and reciprocating 32 grate segments and are linked by a near vertical grate 40 with multiple angled and controllable openings 42 for admission of combustion air from below the grate structure into the fuel load above. It will be seen that the solid fuel inlet 21 into chamber 14 from auger 9 is generally behind the grate structure 20 relative to the general direction of projection of the grate structure and the overall direction of flow of the solid fuel.

In general, solid fuel delivered via auger 9 accumulates as a deep load or burden 70 on the grate structure while being dried and preheated on grate 22 and gasified above grate 24. Combustible gas (syngas) is drawn through a transverse slot port 19 into chamber 17, from one end 15 of which is recovered combusted flue gas or syngas useable for subsequent heating or power generating purposes. Inorganic solid residue or ash that falls over the downstream end of grate 24 is directed by a baffle device 50 into an ash grate 52 arranged on the heated floor 13 of the housing. The ash is gradually agitated along the floor 13, and moved while remaining carbon is oxidised, for transverse removal and recovery by conveyor 54.

An overhead water-cooled refractory lining 56 is suspended from the roof 11 of housing 12 and merges into the wall structure of cycloburner 16. Lining 56 also defines one edge of slot port 19 through which combustible gases pass from the primary chamber 14 to the secondary chamber 17. Roof 11 supports an emergency exhaust stack 58.

Figure 4:
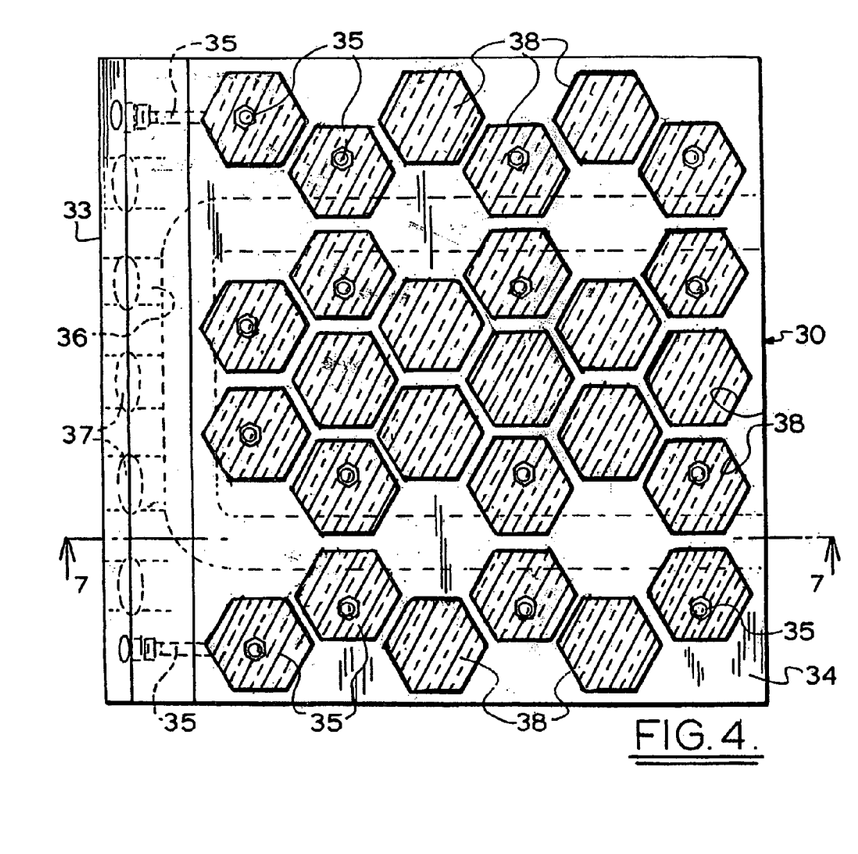
FIG. 4 is a plan view of one of the fixed grate segments.

Grates 22, 24 are of generally similar construction and essentially differ only in their exact inclination, as will be discussed in due course. Each fixed grate segment 30 is of generally flat plate configuration, is, for example, about 0.3 to 1 metre front to rear, and is formed from a base plate 33 (FIGS. 4-5) and a top plate 34. Plates 33, 34 may be clamped together by multiple screws 35 applied from below and from the front. The width of the plate is set to match that of chamber 14. The two plates 34, 35 which are cast in metal alloy or a suitable ceramic, preferably a heat resistant/high temperature alloy, so as to form a substantially rigid body, have complementary channels 36a, 36b that define an open-ended passage 36 within the grate segment that is a square U when viewed in plan. During operation of the gasifier, combustion air is supplied to passage 36 and from there is ejected through the front face of the grate segment via plural nozzles 37 (best seen in FIG. 11). The air delivered via nozzles 37 may be or include recycled gases from the cycloburner or elsewhere.

Top plate 34 is also punctuated by a dispersed regular array of hexagonal cavities 38 which open in the top surface of the plate, are generally shaped and arranged honeycomb fashion, and are filled with an appropriate high temperature refractory material, eg a suitable ceramic, in the finished grate segment. Cavities 38 are preferably on a 10-100 mm square array, with 5-20 mm alloy wall thickness.

Figure 2:
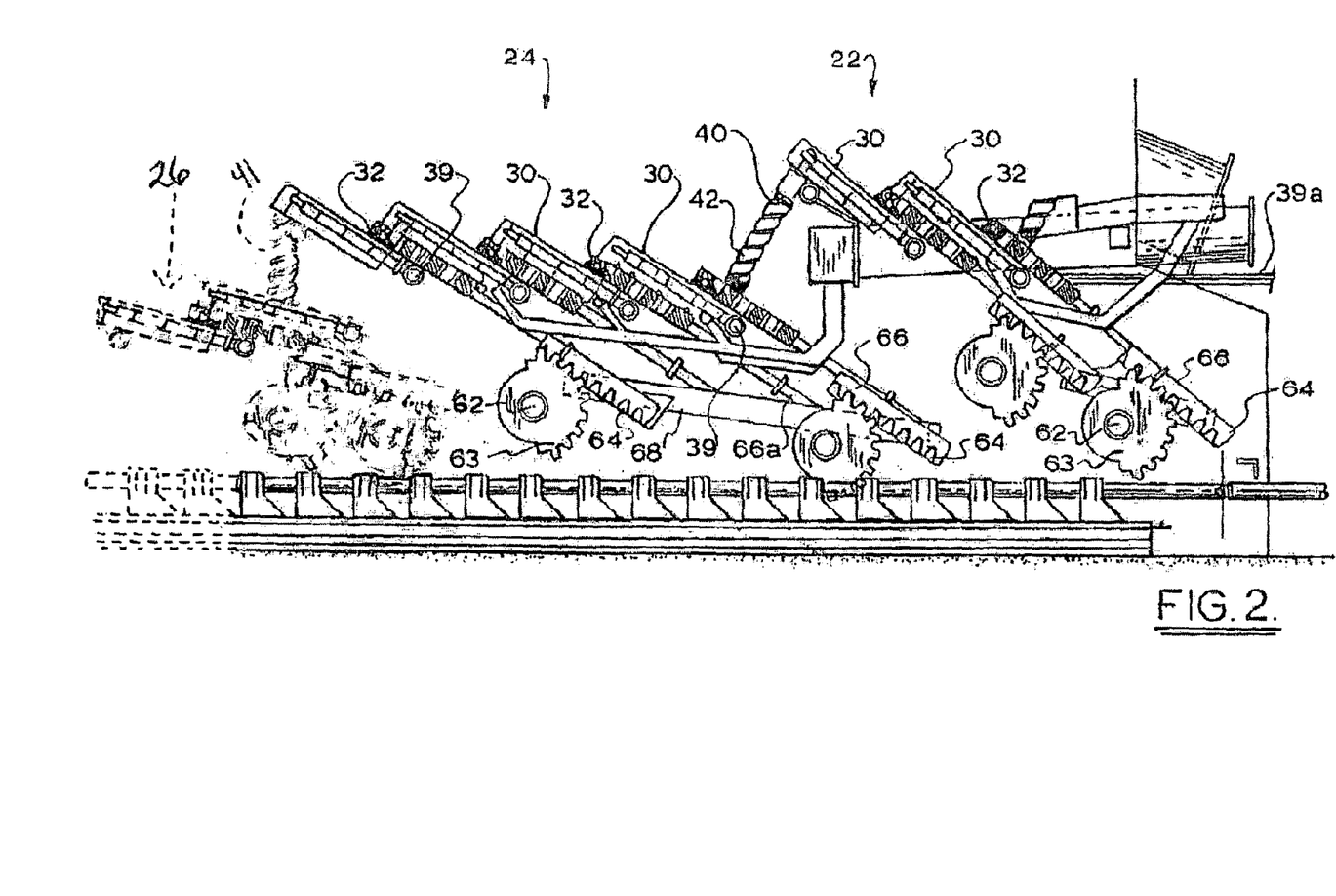
FIG. 2 is an enlargement, with additional detail, of the grate structure forming part of the gasifier illustrated in FIG. 1.

Air passages 36 communicate with transverse air manifold ducts 39 (FIG. 2) at the rear of each fixed grate segment and these ducts 39 are linked, as diagrammatically depicted in FIG. 2, to an air supply conduit 39a.

Figure 3:
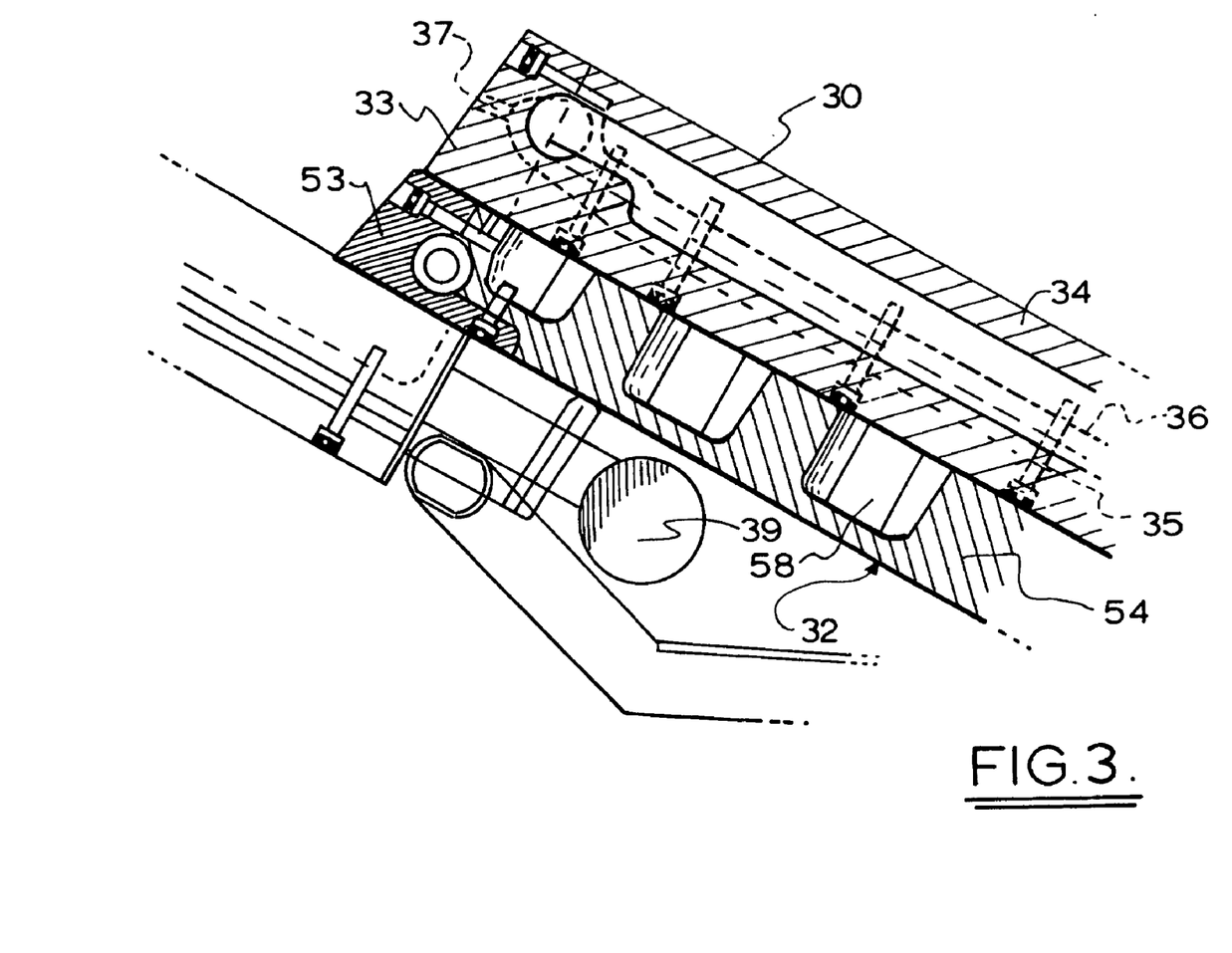
FIG. 3 is a further enlargement of part of FIG. 2.
Figure 5:
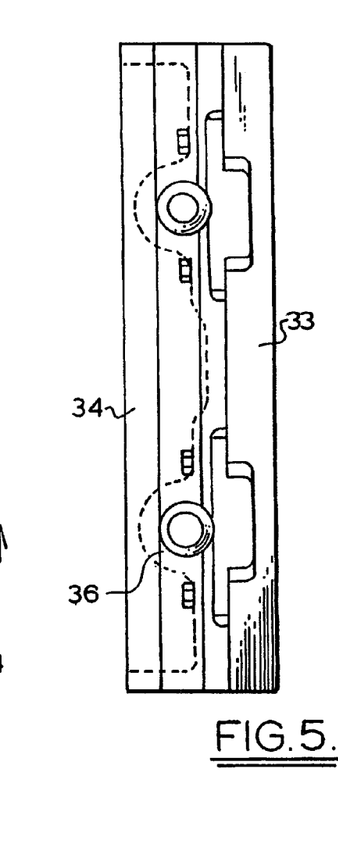
FIGS. 5, 6 and 7 are respectively an end elevation, a side elevation and a cross section on the line 7 to 7 of FIG. 4.
Figure 6:
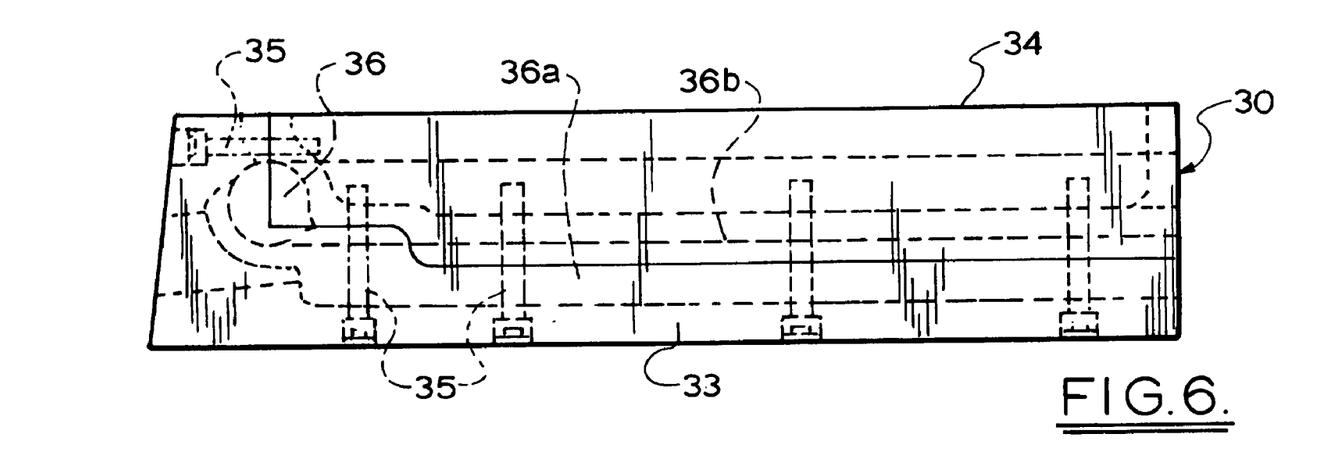
Figure 7:
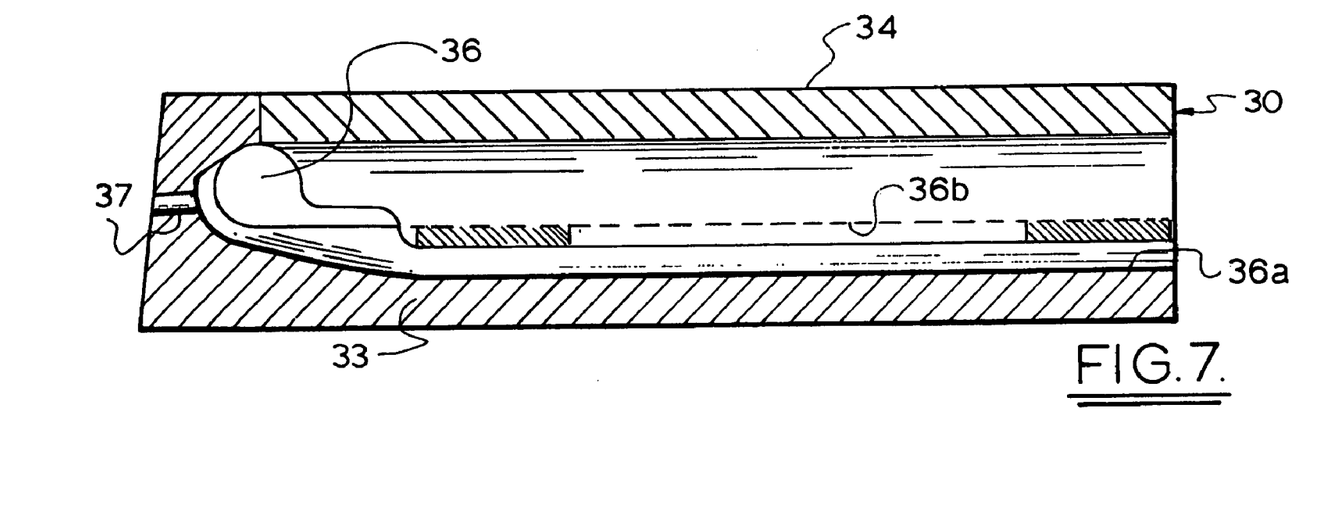
Figure 8:
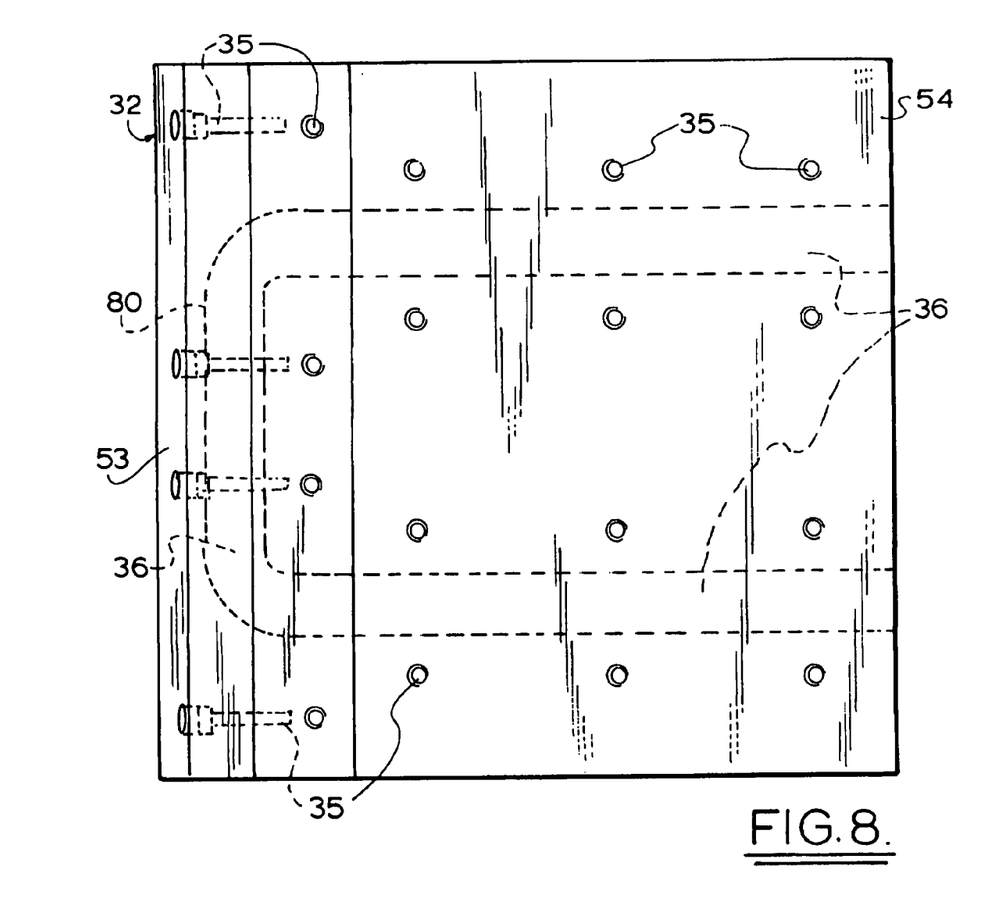
FIGS. 8 to 10 are views corresponding to FIGS. 5 to 7 but for a reciprocating grate segment.
Figure 9:
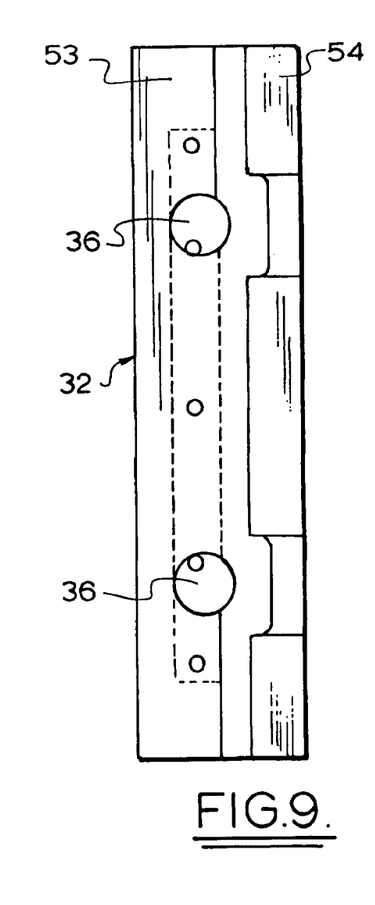
Figure 10:
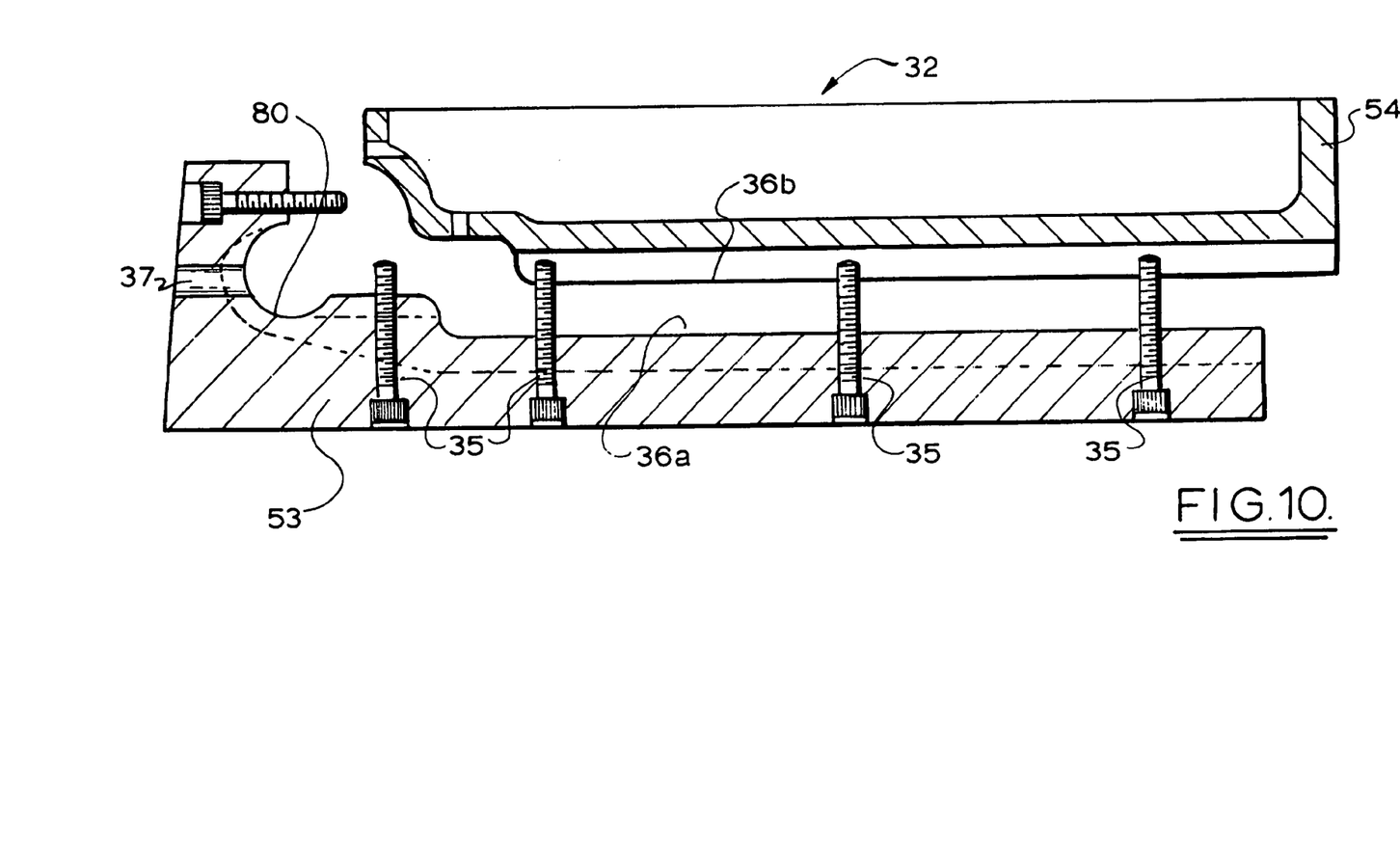

Each reciprocating grate segment 32 is also of two part construction, in this case comprising a front section 53 of generally right angular form and a main body 54 also having refractory (e.g., ceramic) filled hexagonal/honeycomb cavities 58 (FIGS. 3 and 5).

Water passages 80 may be located about the periphery of the lower surface of each grate segment in order to maintain the segment at a temperature whereby overheating does not occur. However, the particular preferred design of grate segment employed is able to operate at higher than conventional temperatures.

It will be seen from FIGS. 1 and 2 that, in each grate set 22, 24, the fixed grate segments 30 are staggered in stepped fashion, being aligned at a uniform angle to the horizontal so as to slightly overlap, and that the reciprocating segments 32 are slidable between and atop the fixed segments 30. The angle of inclination can vary between horizontal and 60° to horizontal outward and upward, but preferably at least 10°, and is steeper (about 40° versus about 30°) in preheater grate 22 relative to gasifier grate 24. This is because the typically wet fuel grate 22 has a greater angle of repose and larger particle size than the fuel on grate 24.

Referring to FIG. 2, in a larger installation, a further grate 26 may be provided downstream of grate 24, optionally having a still smaller inclination to the horizontal. This third grate zone may enhance post-reduction of the residual ash component from grate 24. Typically, this third grate 26 would be separated from grate 24 by a second step grate 41—preferably higher than step grate 40.

Grate segments 32 are reciprocated jointly over a stroke extending approximately between the front edges of the adjacent fixed segments: the fully retracted position is depicted by heavy lines in FIG. 1 and the fully extended position by light lines. The outward or forward stroke of the reciprocation is in the overall direction of flow of the fuel burden. The stroke is typically in the range 100-500 mm, and the stroke period is preferably 10 secs or more eg. in the range 15 secs to 10 mins. A suitable arrangement for effecting reciprocation is shown in the drawings. Each set or bank of grate segments has a pair of drive shafts 62 with respective tooth sectors 63. These engage with racks 64 carried by a respective drive arm 66 which also carries the cooling water. A cross-link 68 is coupled to respective drive arms 66a for the other segments so that the grate segments reciprocate in unison.

The drive gear sectors are arranged to be driven in a first direction which causes the drive arms to move longitudinally relative to the longitudinal axis of the arms so as to extend the moveable grate segments relative to the fixed grate segments. Reversed movement of the drive sectors causes a retraction of the moveable grate segments 32. Thus, reciprocating movement of the drive sectors causes the moveable grate segments to move back and forth relative to the fixed grate segments 30.

In operation, solid fuel is delivered by auger 9 to the combustion chamber 14. A bed of the fuel forms atop grates 22, 24 in the approximate volume indicated by the dot-dash line 70 in FIG. 1. The body of solid material is predried on grate 22, while gasification or pyrolysis takes place above adjacent grate 24. Air for combustion (which may be wholly or partly recycled gases from the cycloburner and/or the primary combustion chamber) is delivered into the fuel body both through openings 42 in step grates 40 and via air nozzles 37 in the front faces of fixed grate segments 30. Sustained reciprocating movement of moveable grate segments 32 is effective to agitate the fuel and enhance its combustion, and to steadily and slowly stroke or convey it along the chamber. There is also a degree of reverse rolling agitation of the material in the fuel burden, further enhancing the gasification reactions. The fines in particular are mixed and agitated but without significant expulsion of airborne particles. The result is an optimum fuel load profile. The height of the fuel pile in the drying zone at grate 22 is regulated by the speed of the grate relative to the fuel feed auger speed, and the height of grate 24.

A typical profile of fuel in the various zones can be ascertained from the representation 70 in FIG. 1. As can be seen, the greatest thickness of the fuel pile in any zone is located over the movable grates 32 most adjacent the upstream step grate 40. It is believed that this fuel pile profile provides good gasification zones. In furnaces, fuel profiles and depths would typically be quite different from that illustrated.

The openings 42 in step grate 40 may preferably increase in size towards the lower edge of the step grate, or may only extend over a portion, eg. a lower portion, of the step grate. There may be one or more air boxes behind the step grate that preferably taper to a cross-section at the upper side matching the adjacent fixed grate segment 30. The air box may then supply controlled air through this fixed grate segment.

Figure 11:
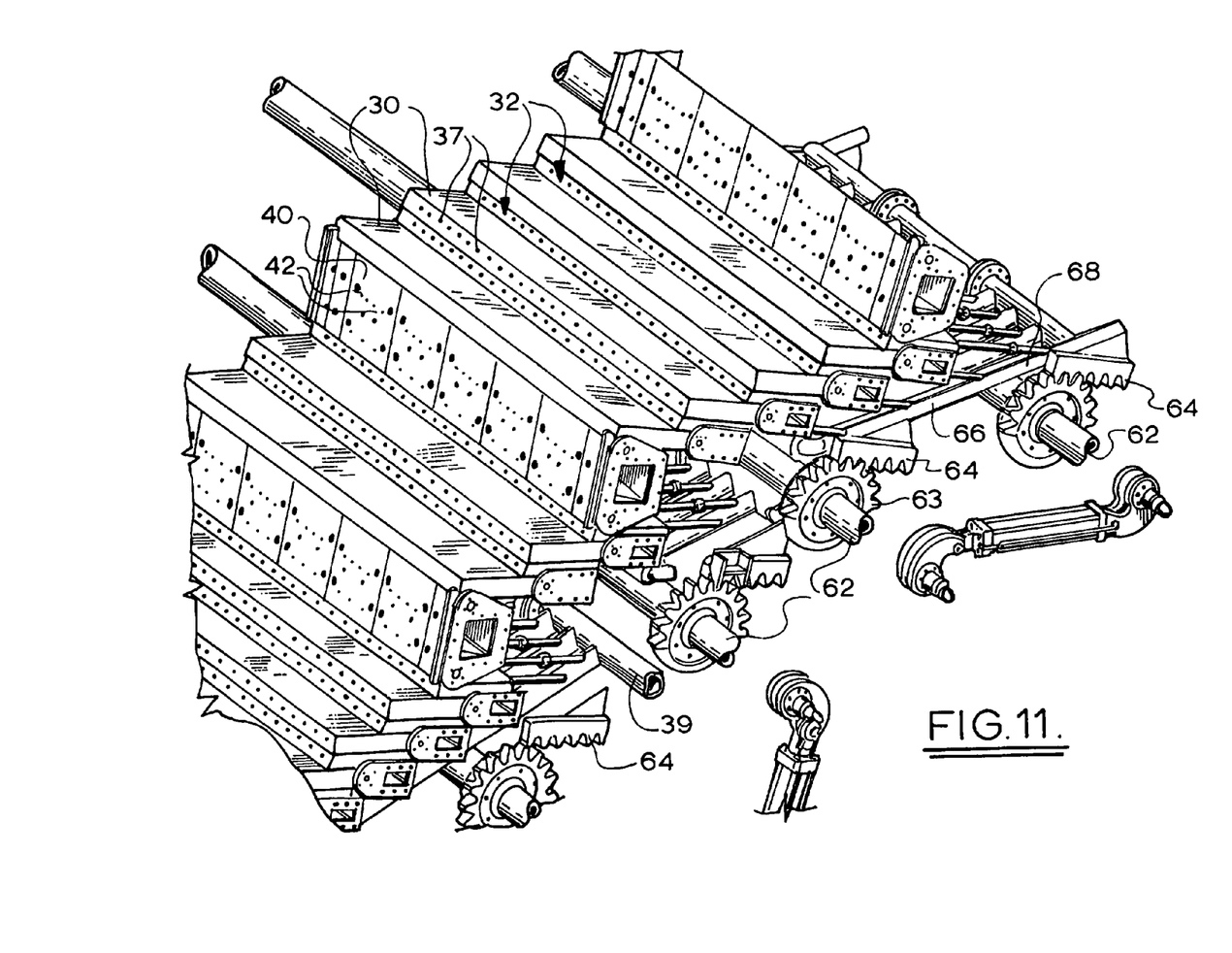
FIG. 11 is a fragmentary isometric view of a modified form of the grate structure.

FIG. 11 illustrates a modified form of the grate structure, with like pairs indicated by line reference numerals.

It is thought that the design of the grates in the preferred construction described above is effective in reducing maintenance relative to that conventionally required with the high temperatures and reducing atmosphere. The ceramic filled honeycomb cavity configuration enables a significantly higher temperature of the fuel mass on the grate surfaces, relative to that achievable with conventional steel surfaced grates, and thereby allows more efficient combustion and gasification.

The invention claimed is:

1. A solid fuel gasifier comprising:
a housing defining a gasifier chamber;
a grate structure in said gasifier chamber comprising a base, a plurality of agitator elements positioned relative to the base for reciprocating movement to agitate a fuel load in the gasifier, means to support the base and the agitator segments so that the latter reciprocate in a direction at a substantial inclination to both horizontal and vertical with an outward stroke that is also upward; and a solid fuel inlet;
said grate structure arranged as a plurality of banks of agitator elements comprising a first bank that serves as a preheater and drying grate, and at least a second subsequent bank that provides for gasification of the fuel volatile matter and fixed carbon oxidation;
whereby in use of the gasifier a deep burden of fuel accumulates on the grate structure, whereby said outward and upward stroke of said reciprocation is in the overall direction of flow of the fuel burden or generally oppositely thereto; and
wherein said preheater and drying grate is arranged so that the agitator elements reciprocate in a direction more steeply inclined to the horizontal than that for the gasification grate(s).

2. A solid fuel gasifier according to claim 1 wherein said reciprocating movement is effective to agitate the fuel and enhance its combustion, and to steadily and slowly stroke or convey it along the chamber.

3. A solid fuel gasifier according to claim 1 wherein further gasification banks are less steeply inclined than the second grate for gasification.

4. A solid fuel gasifier according to claim 1 wherein said grate structure comprises respective substantially fixed grate sections forming the base, and moveable grate sections forming the agitator elements, which moveable sections reciprocally slide over the fixed sections.

5. A solid fuel gasifier according to claim 4 wherein there are multiple pairs of said fixed grate sections and said moveable grate sections.

6. A solid fuel gasifier according to claim 4 further including means to admit air to the fuel burden via passages and/or port means in the fixed grate sections.

7. A solid fuel gasifier according to claim 6 wherein said air admission means opens into the fuel burden in the end surfaces of the fixed grate sections.

8. A solid fuel gasifier according to claim 4 wherein each of said grate sections is formed from grate segments each comprising a substantially rigid body having a dispersed array of cavities filled with a refractory material.

9. A solid fuel gasifier according to claim 8 wherein said refractory material is a ceramic material.

10. A solid fuel gasifier according to claim 8 wherein said dispersed array of cavities is such that the grate segment exhibits a generally honeycomb structure.

11. A solid fuel gasifier according to claim 8 in which said cavities are open in a surface of the respective grate segment that is exposed to heat in operation of the gasifier.

12. A solid fuel gasifier according to claim 1 wherein said solid fuel inlet feeds fuel into the chamber from generally behind said grate structure relative to the overall direction of flow of the fuel.

13. A solid fuel gasifier comprising:
a housing defining a gasifier chamber;
grate structure in said gasifier chamber comprising:
a base;
a plurality of agitator segments positioned relative to the base for reciprocating movement to agitate a fuel load in the gasifier; and
means to support the base and the agitator segments so that the latter reciprocate in a direction at a substantial inclination to both horizontal and vertical; and
a solid fuel inlet;

wherein said grate structure is arranged as a plurality of banks of agitator elements, including a first bank that serves as a pre-heater and drying grate, and at least a second subsequent bank that provides for gasification of the fuel volatile matter and fixed carbon oxidation, whereby the first bank and the second bank are linked by an upright grate such that a deep burden zone of fuel accumulates between the first and second banks; and wherein said preheater and drying grate is arranged so that the agitator elements reciprocate in a direction more steeply inclined to the horizontal than that for the gasification grate(s).

14. A solid fuel gasifier according to claim 13 wherein subsequent banks of agitator elements are linked by upright grates such that deep burden zones of fuel accumulate between the banks.

15. A solid fuel gasifier according to claim 13 wherein further gasification banks are less steeply inclined than the second grate for gasification.

16. A solid fuel gasifier according to claim 13 wherein said grate structure comprises respective substantially fixed grate sections forming the base, and moveable grate sections forming the agitator elements, which moveable sections reciprocally slide over the fixed sections.

17. A solid fuel gasifier according to claim 16 wherein there are multiple pairs of said fixed grate sections and said moveable grate sections.

* * * * *